United States Patent [19]
Hofer et al.

[11] 4,042,893
[45] Aug. 16, 1977

[54] METHOD AND APPARATUS FOR IMPROVING TRANSMISSION LINE CHARACTERISTICS

[75] Inventors: Ernst Hofer; Max Schlichte, both of Munich, Germany

[73] Assignee: Siemens Aktiengesellschaft, Munich, Germany

[21] Appl. No.: 242,751

[22] Filed: Apr. 10, 1972

Related U.S. Application Data

[63] Continuation of Ser. No. 11,681, Feb. 16, 1970, abandoned, which is a continuation of Ser. No. 562,864, July 5, 1966, abandoned.

[51] Int. Cl.² .......................... H03H 7/14; H04B 3/14; H04B 3/10
[52] U.S. Cl. ............................ 333/28 R; 179/15 AN; 333/12; 333/70 CR
[58] Field of Search ..................... 333/28 R, 73 R, 12, 333/20, 70 CR; 179/15 R, 15 AN; 178/45, 46

[56] References Cited
PUBLICATIONS

Henney – "Radio Engineering Handbook," McGraw Hill, New York, 1941, pp. 51–53.
Moskowitz, "Cross-Talk Considerations in Time-Division Multiplex Systems Proceedings of the IRE," Nov. 1950, pp. 1330–1336.
Rounds et al.,—Equalization of Cables for Local Television Transmission, B.S.T.J. vol. 34, No. 4, July 1955, pp. 713–733.

*Primary Examiner*—Alfred E. Smith
*Assistant Examiner*—Marvin Nussbaum
*Attorney, Agent, or Firm*—Gerald L. Lett

[57] ABSTRACT

A technique of reducing "crosstalk" in transmission lines for time multiplex pulse communication, by insertion of artificial compensating networks having an impedance varying with frequency in opposite sense as compared with the natural impedance of the line. The values of the elements of the network are determined by transmitting a pulse over the line and determining the distortion to that pulse.

17 Claims, 5 Drawing Figures

METHOD AND APPARATUS FOR IMPROVING TRANSMISSION LINE CHARACTERISTICS

BACKGROUND OF THE INVENTION

This application is a continuation of application Ser. No. 11,681, filed Feb. 16, 1970, now abandoned, which was a continuation of application Ser. No. 562,864, filed July 5, 1966, now abandoned.

This invention relates to a method and apparatus for improving transmission line characteristics and, more particularly, for decreasing interaction of electrical pulses, transmitted over a transmission line, which interaction can result in the common phenomenon known as cross talk. The invention has particular applicability in time multiplex systems such as may be employed in telephone exchange installations. By reducing the pulse interaction, or cross talk, in accordance with the invention, the speed of transmission of pulses over a transmission line can be increased. The increase in speed corresponds to a decrease in the blanking periods between successive or adjacent pulses, thereby permitting an increase in the number of separate channels of a time multiplex pulse transmission system, and thus an increase in the number of subscriber stations which may be connected to a common line for joint transmission thereover in time multiplex transmissions.

The invention provides compensation for the frequency dependent characteristics of transmission lines, resultant from the well-known skin effect or Heaviside effect, and thereby reduces the interaction of electrical pulse signals transmitted over transmission lines. By reducing the pulse interaction, cross talk between separate channels is also reduced. The compensation provided by the invention can be effected in accordance with either of two embodiments. These two embodiments of the invention may be effected through different techniques whereby the beneficial effects of each such embodiment may be combined to further improve the transmission characteristics of a transmission line.

In accordance with a first embodiment of the invention, the frequency dependency is reduced through the use of a compensation network which is inserted into the transmission line and which compensates for the deleterious frequency dependency of the transmission line.

In accordance with a second embodiment of the invention, the skin effect resulting from transmission through the transmission line is itself reduced. The reduction in skin effect is achieved through changing the magnitudes of characteristics of the transmission line which determine the skin effect.

The invention further comprises a technique for determining the characteristics of one or more compensation networks which are to be inserted into a given transmission line. For this purpose, a transmission line is terminated in a short circuit at its receiving end and its characteristic impedance at its input end. A square wave electrical pulse then is transmitted over the transmission line from the input end. The current amplitude in the transmission line is measured as a function of time to determine the distortion of the pulse. From these measurements, there is then determined the time constant of the compensation network, which is required for compensating the transmission line. The invention further comprises techniques for determining the electrical characteristics and values of the compensation network elements in accordance with the characteristics of the transmission line to be compensated, and the insertion of compensation networks into the transmission line for providing required compensation.

STATE OF THE PRIOR ART

Time multiplex operation of transmission lines is well known in the art. In accordance with time multiplex operations, several independent and unrelated signals may be transmitted over a single or common transmission line. For this purpose, each of the individual signals is employed to modulate a respectively associated train of pulses. The plurality of pulse trains are commonly referred to as defining individual communication channels of the time multiplex system for transmission over the single transmission line. The plurality of pulse trains are then transmitted in predetermined time relationship to each other. At the receiving end of the transmission line, the thus multiplexed pulse trains are separated in accordance with their respective channels, for deriving from the single transmission line the plurality of signals transmitted thereover.

To achieve maximum utilization or load handling capability of the transmission line, adjacent, or succeeding pulses of corresponding adjacent, or succeeding, pulses trains must be transmitted with a minimum time duration or blanking period therebetween, and thus must occur in rapid succession. In time multiplex transmission in telephone exchange systems, the blanking period separating two such adjacent pulses is typically of shorter duration than one microsecond.

The minimal time separation of the adjacent pulses of successive pulse trains which is necessary to efficient utilization of the transmission line, however, produces extreme criticality in the required transmission line characteristics to assure proper transmission of the pulses. More particularly, the minimal time separation of successive pulses presents the problem that adjacent pulses, and thus the signals which modulate the corresponding pulse trains, may interact. If the interaction is not eliminated, cross talk between the channels may result.

As noted previously, extremely short blanking periods typically are required in a time multiplex telephone exchange system, especially if the number of subscriber stations capable of being connected for transmission over a single transmission line of the system is very large. To effect the multiplex transmission, the system scans subscriber connections in a rapid periodic sequence to sample the signal values presented by the modulated pulse trains at each connection for transmission. The sampling technique therefore additionally requires that the transmitted pulses be spaced in extremely short time intervals for maximum efficiency in the sampling and transmission functions.

There have been provided heretofore in the prior art, methods for reducing interaction of pulses transmitted over a transmission line in time-spaced relationship. For example, it is known to ground the transmission line during the blanking period or time interval between two adjacent pulses. The grounding of the transmission line reduces cross talk by a register effect of the transmission line resulting from its capacitive loading characteristic. Although the grounding technique provides some improvement, it does not completely avoid the deleterious interaction of pulses, particularly when the pulses are transmitted with extremely short blanking periods therebetween.

OBJECTS OF THE INVENTION

The method and apparatus of the invention overcome these and other defects which result from deleterious transmission characteristics of transmission lines, but which have not been solved heretofore in the prior art.

It is therefore an object of this invention to provide an improved method and apparatus for compensating for deleterious transmission characteristics of transmission lines.

Another object of this invention is to provide an improved method and apparatus for reducing interaction between pulses transmitted over a transmission line.

A further object of this invention is to provide an improved method and apparatus for reducing deleterious transmission characteristics of a transmission line resulting from skin effects of the line.

Still another object of this invention is to provide an improved method and apparatus for reducing the deleterious frequency dependency of response of a transmission line to signals transmitted thereover.

Still a further object of this invention is to provide an improved method and apparatus for reducing cross talk between pulse channels of a time multiplex transmission system.

It is another object of this invention to provide an improved method for determining the required components and values of compensation networks inserted into a transmission line in accordance with the invention to compensate for deleterious transmission characteristics thereof.

These and other objects of this invention will become apparent from the following detailed description of the invention.

DETAILED DESCRIPTION OF THE INVENTION

Figure 1:
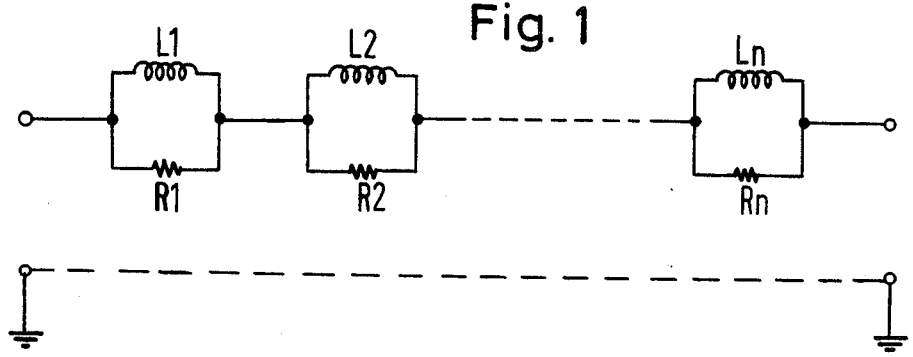
FIG. 1 shows an equivalent circuit diagram of a transmission line having a frequency dependent response to signals transmitted thereover resulting from skin effects.

In FIG. 1 there is shown the equivalent circuit schematic of a transmission line. The inductance and resistance effects of the transmission line are indicated by lumped impedances shown as a plurality of parallel LR networks. A plurality of the lumped impedance networks, each including an inductor and a resistor L1 and R1, R2 and L2 . . . Rn and Ln, is shown to indicate the equivalent distributed resistance and inductance effects of the transmission line.

The inductors L1, L2 . . . Ln represent the inherent inductance of the transmission line, i.e., inherent inductance comprising that associated with the skin effect of transmission in the transmission line at high frequencies. The resistors R1, R2 . . . Rn correspond to the resistance of the transmission line relating to the conduction paths of eddy currents or hysteresis currents therewithin and resulting from the inherent inductance of the transmission line. The inherent inductance and the eddy current resistance paths represent the inherent impedance characteristics resultant from the skin effect or Heaviside effect of high frequency transmission in a transmission line. It is to be noted that in connection with the description given of this figure and FIG. 2 direct current resistances have been ignored. The effects of direct current are negligible with respect to the compensation technique to be discussed below.

As discussed in detail hereafter, the time constants of the individual ones of the LR networks L1 and R1 . . . Ln and Rn may be defined to be of different values. By representing the impedance characteristics of the transmission line in an equivalent circuit schematic employing a sufficient number of such LR networks, the skin effect resulting from high frequency transmission through the transmission line can be analyzed to a high degree of accuracy. Generally, the number of LR networks required to accurately represent the impedance of a transmission line is greater for a transmission line of large cross section than for a transmission line of smaller cross section. The cross sectional dimension is significant in that the skin effect increases with increasing cross section of a conductor employed as a transmission line.

In accordance with the invention, the frequency dependent skin effect of a transmission line is decreased. As a result, interaction and the resultant distortion of electrical pulses, initially applied to the transmission in proper time-spaced relationship, due to the deleterious characteristics of an uncompensated transmission line is decreased. As mentioned previously, the method for effecting the decrease in the frequency dependency may be achieved in accordance with two embodiments of the invention.

In accordance with a first embodiment of the invention, the frequency dependence of the transmission line is decreased by inserting into the transmission line at least one compensation network having an impedance which changes with the frequency of applied signals. More particularly, the compensation network includes a capacitor, and the impedance value of which changes in the opposite sense to the change in value of the inductor of the equivalent impedance network of the transmission line corresponding to the skin effect. The circuit structure or apparatus and the method for accomplishing the compensation in accordance with the invention will become apparent from a consideration of FIG. 2.

Figure 2:
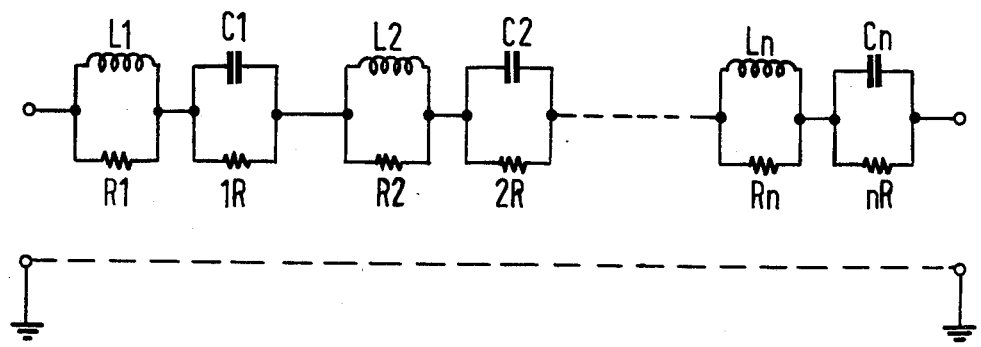
FIG. 2 shows an equivalent circuit of a transmission line in accordance with FIG. 1 further including compensation networks in accordance with the invention for reducing the frequency dependency of the transmission line.

FIG. 2 shows the equivalent circuit of a transmission line including lumped LR networks, as described with respect to FIG. 1. In FIG. 2 there is further provided a plurality of compensation networks in accordance with the invention. Each of the compensation networks comprises a parallel resistor and capacitor circuit, a plurality of such networks including resistors and capacitors 1R and C1, 2R and C2 . . . nR and Cn is shown connected in relation to corresponding ones of the lumped equivalent impedance networks of resistors and inductors R1 and L1, R2 and L2 . . . Rn and Ln. Each of the compensation RC networks therefore is associated with a respectively associated LR network of the equivalent circuit of the transmission line.

By providing the proper values of the circuit elements of the compensation networks, the frequency dependent effects of the lumped impedance networks to which each of the compensation networks respectively correspond is compensated. Since the impedances of corresponding lumped impedance and compensation networks vary in opposite sense with respect to the frequency of applied signals, and by providing proper impedance values of the associated inductors and capacitors, a purely resistive effect of the combined networks may be attained which therefore renders the combined electrical characteristics of the associated networks independent of the frequency of applied signals.

The determination of the relative impedance values of the circuit elements of associated lumped equivalent impedance networks and compensating networks is in accordance with the equations given below. Generally, it is desired that the associated networks have the same time constant. For example, with respect to the lumped impedance network L1 and R1 and the corresponding compensating network 1R and C1 the purely resistance value of the resistors R1 and 1R should be the same, and therefore is represented by the same letter R in the following equations. The letters L and C represent the inductance of inductor L1 and the capacitance of capacitor C1. The time constant of the parallel inductor L1 and resistor R1 impedance network is determined by the ratio of th corresponding inductance and resistance values, represented by L/R. The time constant of the parallel resistor R1 and capacitor C1 network is determined by the value RC. For the same time constants, to be provided for the two circuits, the resultant equation is $$L/R = RC \quad (1)$$

since the values R are the same, the equation (1) may be rewritten as:

$$R = \sqrt{L/C} \quad (2)$$

By providing a compensation network wherein the values of the circuit elements bear the relationship as defined in equation (2) to the impedance values of the lumped impedance network of the transmission line, the frequency dependency thereof may be eliminated. It should be noted that the compensation networks provided in the transmission line in accordance with the invention need not be distributed over the entire transmission line as suggested by the equivalent circuit thereof, as shown in FIG. 2, which includes a plurality of such lumped impedance networks. Rather, and in the alternative, a single compensation network may be inserted at either the input end and/or at the output end of the transmission line.

The foregoing discussion relating to the equivalent circuit of FIG. 2 and the compensation networks provided therein for the transmission line sets forth the determinative conditions by which frequency dependency of the transmission line to signals transmitted thereover may be eliminated. The determination of the values of the elements of the compensation networks, however, cannot be made by measuring the transmission line under static conditions. More specifically, the inherent inductance and resistance effects resulting from eddy current conduction in the transmission line is not a characteristic which can be measured by ordinary test equipment applied to the input or other terminals of the transmission line. Rather, these values vary in accordance with the signals transmitted over the transmission line and therefore must be determined under operating conditions, or dynamic conditions analogous to the operating conditions of the transmission line.

The invention provides alternative first and second techniques whereby the dynamic determinations of electrical values of the elements of a compensation network for employment in a transmission line may be effected. A first technique comprises, generally, applying an input signal of defined wave shape to the transmission line and measuring the distortion of the signal to determine the necessary time constant of the compensating network. The distortion is measured as a function of the attenuation curve or gradient of the current pulse in the transmission line resulting from the applied signal at the input terminals. In effecting this measurement, the transmission line is terminated at its input terminals by the characteristic impedance of the line and the output terminals of the line are terminated in a short circuit. The resulting circuit structure and the technique for determining the values of the elements of the compensation network are described more fully with respect to FIGS. 3 and 4.

Figure 3:
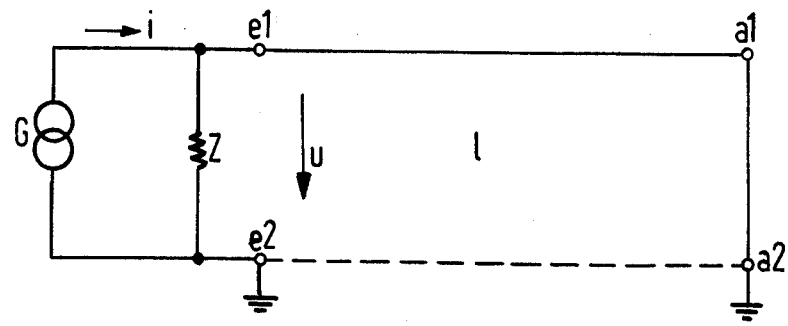
FIG. 3 shows a circuit schematic in accordance with a technique of the invention for determining the characteristics of the components of the compensation networks shown in FIG. 2.
Figure 4:
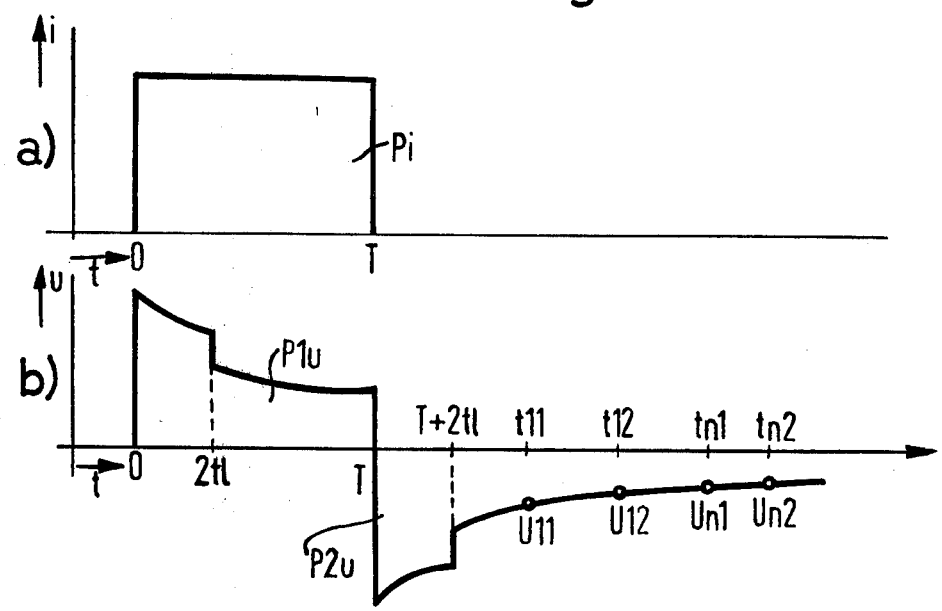
FIGS. 4a and 4b show current and voltage waveforms, respectively, of an electrical pulse transmitted over a transmission line and measured in accordance with the circuit of FIG. 3.

FIG. 3 shows a circuit schematic of a transmission line in accordance with the operation thereof for determining the data necessary for ascertaining the values of the elements of a compensation network to be inserted in the transmission line. The transmission line 1 includes input terminals e1 and e2 and output terminals a1 and a2. The transmission line 1 may comprise a single conductor represented as the solid line connecting the input and output terminals e1 and a1. The return conductor represented by the dotted line between terminals e2 and a2 may be provided by a ground connection at the terminals e2 and a2. In the alternative, the transmission line 1 may comprise the first conductor connection terminals e1 and a1 and a second conductor connecting terminals e2 and a2 whereby the dotted line between the latter terminals represents a second conductor.

The input terminals of the transmission line 1 are terminated by the characteristic impedance Z of the transmission line. Further, the input terminals e1 and a2 are connected to the output terminals of a generator G. The input terminals a1 and a2 of the transmission line are terminated in a short circuit connection.

The generator G produces output pulses of square waveform and of constant current amplitude. The arrow and letter $i$ represent the flow of a current $i$ representing an output pulse from generator G. The letter $u$ and its associated arrow represent the voltge pulse generated across the characteristic impedance in response to the current pulse $i$, for transmission along transmission line 1.

FIG. 4a shows the waveform of a signal pulse Pi applied to the transmission line 1 by the generator G and measured across the input terminals e1 and e2 of the line 1. In FIG. 4a, the current $i$ is plotted as a function of time, $t$. The current pulse Pi is of square or rectangular waveform and is initiated at time 0 and terminates at time T. The pulse Pi is therefore of the time duration T.

FIG. 4b is a graph of the voltage $u$ measured between the input terminals e1 and e2 of the transmission line 1 as a function of time, $t$. The waveform of the voltage pulse resulting from the current pulse Pi (of FIG. 4a) departs considerably from the waveform of the latter and represents substantial distortion thereof.

The voltage pulse includes a first portion P1u and a second portion P2u. At time $t=0$, the voltage pulse attains a maximum amplitude, as measured along the voltage amplitude scale u. The amplitude of the pulse in the portion P1u decreases gradually from the time $t=0$ to the time 2tl as a result of the inherent inductance of the transmission line 1.

At the time $t=2t(1)$, there occurs a rapid decrease in the voltage amplitude u. The signal applied to the input terminals e1 and e2 of the transmission line 1 is reflected from the output terminals a1 and a2 and returns to the input terminals e1 and e2. The travel time of a given signal pulse through the transmission line 1 from the input to the output terminals thereof is indicated by the legend tl. The signal pulse applied to the input terminals e1 and e2 of the transmission line 1 is therefore reflected from the short circuited output terminals a1 and a2 at a time tl following the initial application to the input terminals and returns to the latter at time 2tl. The reflected pulse is of opposite polarity to that initially transmitted. As a result, the reflected, opposite polarity pulse adds algebraically to the original input pulse at the time $t=2tl$ and effects a partial cancellation of the magnitude of the latter. The reflected pulse may, therefore, be visualized as overlapping the initially applied input pulse.

Following the time $t=2tl$, the wave form of the portion P1u of the voltage continues to decrease gradually, in accordance with the foregoing discussion, and tends to approach a constant value asymptotically until the time $t=T$.

Following time $t=T$, there is present on the transmission line 1 only the reflected signal pulse. As noted, the reflected pulse is of opposite polarity to the original pulse transmitted at time $t=0$. The portion P2u of the voltage wave form corresponds to the current input pulse Pi of FIG. 4a and results from the reflected voltage pulse. The wave form portion P2u exhibits a similar attenuation curve to that of portion P1u from the time $t=T$ to the time $t=T+2tl$. In accordance with the foregoing explanation of the rapid decrease in the voltage wave form of portion P1u at time $t=2tl$, there occurs at time $t=T+2tl$ in the wave form portion P2u a similar rapid decrease in the negative amplitude of the portion P2u. Following the time $T+2tl$, the wave form of the portion P2u continues to decrease gradually and to approach an asymptote.

The attenuation curves of the wave form portions P1u and P2u may be employed for obtaining data to determine the values of the elements of the compensation networks to be inserted in the transmission line for eliminating the frequency dependence effects thereof. For this purpose it shall be assumed initially that the attenuation curves of each of the portions P1u and P2u decrease continuously throughout in accordance with an exponential function. The discontinuities presented by the rapid decreases in amplitude at times $t=tl$ and $t=T+2tl$ will be ignored. In accordance with these assumptions, the frequency dependency of the transmission line due to the skin effect can be compensated by a single compensation network for which a single time constant is determined.

The determination of the time constant for the single compensation network, in accordance with these assumptions, may be effected by measuring the voltage occurring at selected time positions along the attenuation curve of the portion P2u of the voltage wave form. For example, at times $t=t11$ and $t=t12$, as indicated in FIG. 4b, the amplitude of the voltage u is measured and determined to be of the values U11 and U12, respectively. In accordance with the assumption that the attenuation curve of the pulse portion P2u follows an exponential function, the time dependent function of the voltage u for the pulse thus represented in FIG. 4b may be represented by the following equations:

$$U11 = U0e - \frac{t11}{\tau} \quad (3)$$

$$U12 = U0e - \frac{t12}{\tau} \quad (4)$$

In the equations (3) and (4), UO represents the amplitude of the voltage pulse portion P2u appearing at time $t=T$. $\tau$ represents the time constant which is to be determined. Equations (3) and (4) may be solved to eliminate the value UO, which therefore does not have to be measured, and the following expression may be derived:

$$\tau = -\frac{t12 - t11}{\ln \frac{U11}{U12}} \quad (5)$$

Although the use of a single compensation network having a time constant in accordance with the solution to the equation (5), defined above, provides an approximately correct value for the attenuation curve segment from $t=t11$ to $t=t12$, the single time constant thus determined may not be correct for voltage measurements taken along other segments of the attenuating curve. This result obtains when the attenuation curve is not a true exponential function but rather is composed of several attenuation curves having different exponential functions. In this event, it is necessary to provide several compensation networks, as suggested by the equivalent transmission line lumped into impedance networks and associated compensating networks of FIG. 2, to provide compensation for the frequency dependency of the transmission line due to the skin effect. The several compensation networks inserted into the transmission line have different time constants, in accordance with the composite of exponential attenuation curves represented by the single attenuation curve of FIG. 4b.

Where several compensation networks are to be provided, voltage measurements are taken at various times and thus along different segments of the attenuation curve of the portion P2u of the voltage pulse resulting from the input current pulse Pi. As an example, there are indicated in FIG. 4b the time periods $t=tn1$ and $t=tn2$ at which the voltage amplitude Un1 and Un2, respectively, are determined. A plurality of such pairs of voltages representing segments of the transmission line may be measured from the times $t=t11$ and $t=t12$ to ... $t=tn1$ and $t=tn2$. The segments as thus defined should not include a discontinuity such as those which occur at the times $t=2tl$ and $t=T+2tl$. The segments as thus selected may be sufficiently small and of sufficient number so that accurate determination of the time constants of a plurality of compensation networks may be effected for eliminating the frequency dependency of the transmission line.

In accordance with the foregoing discussion, the time constants of the compensation networks may therefore be determined in accordance with the measurement of voltages at the input terminals $e1$ and $e2$ of the transmission line 1 connected in the circuit shown in FIG. 3.

Equation (5), given above, when evaluated gives the required time constant of the network for the segment of the attenuation curve corresponding to the voltage measurements U11 and U12. It is clear that equation (5) may also be evaluated for any desired segment to determine the time constant of additional compensation networks.

The actual value of the elements of a compensation network, however, must also be determined. This determination is effected through a balancing technique.

For this purpose there is employed a compensation network having electrical elements satisfying the determined time constant and the values of which may be altered in accordance with the balancing technique. The values of the elements of the compensation network are altered and, for each such altered setting, the voltage is measured across the input terminals $e1$ and $e2$ of the circuit of FIG. 3 during the attenuation curve of the portion $P2u$ of the wave form of FIG. 4b. The compensation network is in balanced condition when the attenuation curve of the portion $P2u$ is determined to be of as large a rate of decrease as possible. The large rate of decrease of the attenuation curve implies that the voltage level of the portion $P2u$ approaches the value $u=0$ as quickly as possible. A rapid attenuation of the voltage of the reflected pulse is desirable in that, as a result, the tendency of an earlier transmitted pulse to be delayed and to become mixed with a succeeding pulse is decreased. It will be apparent that this decrease is desirable for preventing mixing of successively transmitted pulses in the normal mode of operation of the transmission line. Thus, the aforedescribed technique utilizing the voltage amplitude values of a reflected signal in the transmission line is suitable for determining the time constant and the value of the elements of a compensation network.

It may result that, due to the properties of a given transmission line, or for other reasons, the aforedescribed technique for determining the values of the elements of a compensation network is ineffective or difficult. In such a case, the following technique for determining these values may be employed. In accordance with this alternative technique, there is transmitted over a transmission line which is to be compensated a pulse train corresponding to one of the connection channels of a time multiplex transmission system. The pulses thus transmitted may have a wave form other than rectangular, for example, a half-cycle sine wave. In accordance with this alternative embodiment, therefore, the transmission line is operated in its normal condition for a time multiplex transmission.

Figure 5:
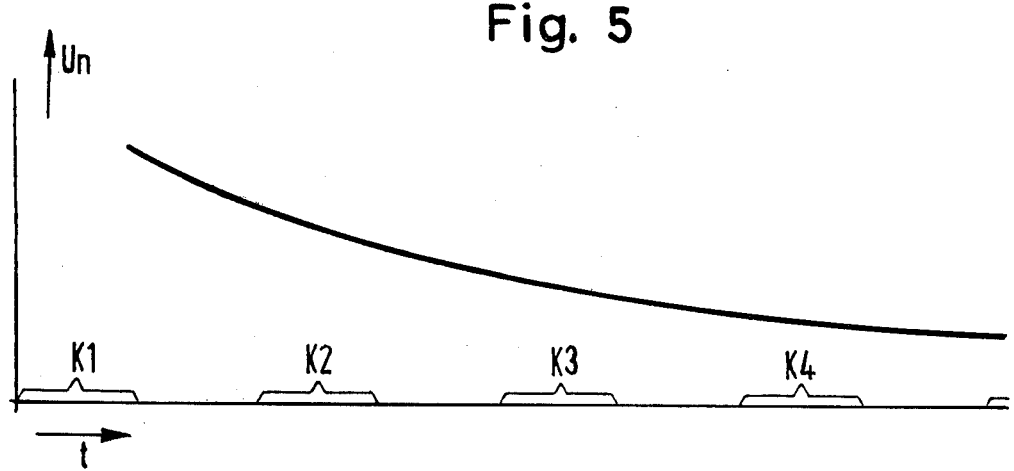
FIG. 5 is a graph illustrating the attenuation of cross talk voltages in a time multiplex transmission system.

FIG. 5 is a graph representing the effect of cross talk in a transmission line operated in a time multiplex system as described above. More particularly, the graph of FIG. 5 shows the amplitude of cross talk voltage coupled into adjacent communication channels, i.e., channels adjacent in time in multiplex transmission over a single transmission line, and resulting from modulation of a first pulse train in a first channel by a signal to be transmitted. The voltage thus coupled is seen to decrease continuously in accordance with a specific time constant.

In the graph of FIG. 5, the amplitude $Un$ of the cross talk voltage is plotted as a function of time, $t$. The cross talk voltage shown in FIG. 5 is caused by a signal modulating the pulse train of communication channel K1. The sections K2, K3, K4... represent separate communication channels corresponding to successively later transmitted pulse trains. The amplitude $Un$ of the cross talk voltage decreases with increasing time $t$ for the pulse trains assigned to the remaining communication channels K2, K3..., according to an exponential function.

In accordance with this embodiment of the invention, the values of the elements of the compensation networks are determined by balancing an adjustable compensation network inserted into the line to reduce to a minimum the amplitude of cross talk voltage appearing in the successive communication channels adjacent the one in which a pulse train is transmitted. For example, a signal to be transmitted is employed to modulate the pulse train corresponding to channel K1. The pulse trains corresponding to the remaining communication channels K2, K3... remain unmodulated, except as to the effect of cross talk.

A compensation network of the appropriate time constant, and having adjustable elements then is inserted into the transmission line. The compensation network is adjusted, such as by varying the value of the capacitor of the compensation network, until the amplitude of the cross talk voltage $Un$ in the next adjacent communication channel K2 is decreased to a minimum. The elements of the compensation link are then further altered until the voltage amplitude $Un$ of the cross talk voltage in communication channel K3 is reduced to a minimum. The values of the elements of the compression network are adjusted in this manner alternately for reducing the voltage amplitude $Un$ of the cross talk voltages in channels K2 and K3 until no further decrease can be achieved.

The adjustable compensation network, by this adjustment, therefore is set to have the optimum values of its elements for achieving the compensation. The adjustable network is replaced by a fixed network having elements of the same values as those set in the adjustable network.

When the optimum values of the elements of the compensation network have been determined in this manner, the time constant of the network coincides with the time constant in accordance with which the cross talk is an uncompensated transmission line decrease between the pulses of different pulse trains with increasing time intervals.

Similarly, as described previously, should it be determined that the insertion of a single compensation network, the values of which are determined as described previously, is not effective to decrease cross talk in further ones of the communication channels, such as K4, ..., as compared to the uncompensated condition of the transmission line, then one or more further compensation networks must be inserted. The values of the elements of such further compensation networks are determined through the balancing or tuning process described previously with regard to the first, single compensation network. For example, a second compensation network is inserted into the line, and the values are determined by the described balancing technique described previously, but with regard to the voltage levels of cross talk in the communication channels K4 and K5 (only a portion of the latter being shown in FIG. 5). The time constants of each further compensation network which then is inserted into the transmission line deviates from the time constant of the first and other compensation networks previously provided.

Further, for each such additional compensation network, the time constant thereof coincides with the time constant of the attenuation curve of the cross talk voltage coupled into the corresponding, further communication channels in the uncompensated transmission line.

The alternative technique through which the values of compensation networks are determined by measuring the amplitude of cross talk voltage coupled into adjacent communication channels is particularly desirable, since pulses having the same pulse shape or waveform as are employed during normal operation of the transmission line are utilized, and since the transmission line itself is operated under its normal or intended operating conditions. The compensation thus provided reduces cross talk during multiplex operation of a transmission line, wherein multiplex transmission of a plurality of modulated pulse trains is effected over a common transmission line.

As mentioned previously, the frequency dependency of the transmission line resulting from the skin effect may also be decreased by decreasing the skin effect itself. For this purpose, the transmission line itself is altered in a manner to change its characteristics which determine the skin effect in a manner to decrease the latter.

One suitable technique for effecting this decrease in skin effect is to employ conductor lines for the transmission line which are of very small diameter. As mentioned earlier, as the diameter of the conductor of a transmission line increases, the phenomenon of skin effect increases. However, the utilization of conductors of a very small diameter may result in an undesirably large ohmic resistance of the transmission line. To reduce the ohmic resistance, the transmission line instead is formed of a plurality of very small conductors which are twisted together. The use of a plurality of individual conductors, each of small diameter, reduces the skin effect. The twisting of the individual conductors into a composite transmission line maintains a normal resistance value of the line, however, without affecting the reduced skin effect. A further technique for reducing the skin effect is to provide a highly conductive outer layer surrounding the conductors of the transmission line.

Each of the above described techniques for decreasing skin effect in a transmission line has the beneficial result of reducing the interaction of electric pulses transmitted over the transmission line. These various techniques for reducing the skin effect may be employed jointly for optimum benefit.

In summary, the invention compensates for deleterious effects resultant from inherent characteristics of transmission lines to provide improved transmission thereover. The invention has particular applicability for improving transmission characteristics of a transmission line to facilitate multiplex operation. The well-known phenomenon of frequency dependency of a transmission line such as results from skin effect due to high frequency transmission therethrough is eliminated in accordance with the invention, whereby higher transmission speeds may be employed. Thus, a greater number of communication channels may be provided in time multiplex operation of a transmission line. As a result, the number of subscriber stations which may be connected to a common transmisson line may be increased, thereby reducing the total number of transmission lines required for a given telephone exchange installation and thus the expense of the telephone communication system. In addition, to increasing the number of communication channels which may be associated with a common transmission line, the reduction of cross talk achieved in accordance with the invention affords more accurate and improved transmission of information over the transmission line. The compensation effected in accordance with the invention requires a minimum number of components which are low in cost. Further, the methods of the invention for determining the values of the elements of the compensation networks and the time constants thereof are very easy to practice and provide for accurate adaptation of the compensation networks to a given transmission line into which the compensation networks are to be inserted.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptions as fall within the true spirit and scope of the invention.

What is claimed is:

1. A method for compensating a transmission line used for time multiplex transmissions, which transmits messages from different channels on a sampled basis in the form of time spaced pulses for each such channel, wherein the transmission line is shorter than the width of the pulses supplied thereto resulting from the time duration and the propogation speed of said pulses and wherein pulses of one channel can overlap to pulses of an adjoining channel due to the influence of skin effect, comprising the step of:

reducing the frequency dependence of the impedance of said transmission line by connecting to said line at least one compensating network having an impedance which varies oppositely with frequency to the variations of the impedance of said transmission line caused by skin effect, but by the same amount.

2. The method defined in claim 1, comprising the further steps of:

determining the frequency dependent inherent attenuation curve of said transmission line by measuring the distortion of an electrical pulse of known waveform transmitted through the transmission line, and inserting into the transmission line a compensation network having a time constant sufficient to correct for to the measured distortion of the transmitted pulse.

3. The method defined in claim 2 wherein said determining step comprises:

terminating the transmission line at the input terminal thereof in the characteristic impedance of said line and at its output terminals in a short circuit, applying a current pulse at the input terminals of the transmission line, measuring the voltage amplitude at said input terminals as a function of time to determine the attenuation of a voltage pulse produced on said transmission line for transmission thereover and resulting from said current pulse and wherein said inserting step comprises:

inserting into said transmission line a compensation network having a time constant corresponding to that of said transmission line, as determined by said measurement of said voltage amplitude.

4. The method defined in claim 3 wherein said measuring step comprises:

measuring the voltage amplitude of the voltage pulse attenuation curve at selected times defining a plurality of time intervals, each said time interval corresponding to a segment of the attenuation curve, and determining the attenuation of the voltage pulse for each such segment of the attenuation curve to define a time constant of a corresponding one of a plurality of compensation networks and wherein said inserting step comprises:

inserting a plurality of said compensation networks into said transmission line.

5. The method defined in claim 3 wherein a reflection from the end of said transmission line causes a reflected pulse to be present following termination of an applied pulse, the method further comprising:

determining the electrical values of the element of a compensation network of a prescribed time constant by adjusting said element thereof to maximize the rate of decrease of the slope of the reflected pulse.

6. The method defined in claim 5 wherein the reflection from the end of said line causes a reflected pulse to be present following termination of the applied pulse wherein the elements of the compensation network include a capacitor and a resistor, the time constant of the network corresponding to the attenuation curve of the measured voltage pulse, and the values of the capacitor and resistor of the network being determined by the balancing.

7. The method defined in claim 1 wherein said compensating network is a parallel resistance-capacitance network and the time constant of said network is determined by the equation:

$R = \sqrt{L/C}$ when:

$R$ = the resistance value of the resistance portion of said network and the resistance of said transmission line caused by skin effect which are equal resistances, $C$ = the capacitance of said network, $L$ = the conductor of said transmission line caused by skin effect.

8. The method defined in claim 1 wherein the pulses are transmitted in a plurality of pulse trains on a single transmission line in accordance with a plurality of corresponding communication channels of successive time intervals of a time multiplex transmission system and comprising the further step of:

transmitting at least one pulse of a pulse train corresponding to a given communication channel, measuring the amplitude of crosstalk voltage coupled into adjacent successive communication channels in response to the pulse transmission in the given communication channel and establishing the time constant of the compensation network in accordance with the decrease in amplitude of crosstalk voltage coupled into the successive communication channels.

9. The method defined in claim 8 comprising the further steps of:

inserting a plurality of compensation networks in sequence into the transmission line, measuring, for each compensation network thus inserted, the amplitude of crosstalk voltage coupled into respectively adjacent successive communication channels and establishing the time constant of each such compensation network in accordance with the decrease in amplitude of the crosstalk voltage coupled into the respectively adjacent successive communication channels.

10. The method defined in claim 9, wherein said inserting step comprises:

providing a parallel circuit of a resistor and a capacitor for each said compensation network, determining the electrical values of resistance and capacitance of each said compensation network in sequence by inserting a compensation network having adjustable relative values of resistance and capacitance into the transmission line and adjusting the values thereof to minimize the amplitude of crosstalk voltage coupled into the adjacent successive communication channels, and replacing the adjustable compensation network with a compensation network having elements of fixed electrical values as determined through balancing of the adjustable compensation network for each of the plurality of compensation networks.

11. In a transmission line for time multiplex transmissions wherein scanning samples of messages from different channels are transmitted in the form of time-spaced pulses, said line being shorter than the width of said pulses resulting from the time duration and speed of propogation of said pulses, said line being compensated to prevent interference between channels as a result of skin effect, the improvement comprising:

at least one compensation network means connected to said line for reducing the frequency dependence of the impedance of said line, said network means having an impedance which varies oppositely with frequency to the variations in the impedance of said transmission line caused by skin effect, but by the same amount.

12. The apparatus defined in claim 11, wherein said compensation network comprises a parallel circuit of a resistor and a capacitor and said resister and said capacitor of said compensation network have values which give to said compensation network a time constant corresponding to the time constant of the attenuation curve of an electrical pulse transmitted in said transmission line.

13. The apparatus defined in claim 12, wherein said resistor and said capacitor have values selected to effect a maximum attenuation of the electrical pulse in said transmission line.

14. The apparatus defined in claim 12 wherein said resistor and said capacitor are selected to have electrical values for minimizing the voltage amplitude of crosstalk voltage coupled into adjacent successive communication channels as a result of electrical pulse transmission in a preceding communication channel during time multiplex transmission in a plurality of communication channels over a single transmission line.

15. The apparatus defined in claim 12 further comprising:

a plurality of said compensating networks inserted into said transmission line.

16. The apparatus defined in claim 12 wherein said transmission line comprises a plurality of small diameter conductors twisted together to form a composite conductor of desired resistance.

17. The apparatus defined in claim 11 wherein said time constant of said compensation network is determined by the equation $R = \sqrt{L/C}$ when:

$R$ = the resistance of said network and of said transmission line caused by skin effect, said resistances being equal, $L$ = the inductance of said transmission line caused by skin effect, $C$ = the capacitance of said network.

* * * * *